United States Patent
Silvestri

(10) Patent No.: US 8,338,525 B2
(45) Date of Patent: Dec. 25, 2012

(54) WATER-BASE ADHESIVE MIX FOR PRODUCING TYRES

(75) Inventor: Carlo Silvestri, Marino (IT)

(73) Assignee: Bridgestone Corporation, Tokyo (JP)

( * ) Notice: Subject to any disclaimer, the term of this patent is extended or adjusted under 35 U.S.C. 154(b) by 283 days.

(21) Appl. No.: 12/740,640

(22) PCT Filed: Oct. 29, 2008

(86) PCT No.: PCT/EP2008/064697
§ 371 (c)(1),
(2), (4) Date: Sep. 13, 2010

(87) PCT Pub. No.: WO2009/056581
PCT Pub. Date: May 7, 2009

(65) Prior Publication Data
US 2010/0326576 A1   Dec. 30, 2010

(30) Foreign Application Priority Data
Oct. 31, 2007   (IT) .............................. TO2007A0777

(51) Int. Cl.
*C08K 3/04* (2006.01)
(52) U.S. Cl. ....................... 524/495; 524/496
(58) Field of Classification Search .................. 524/495, 524/496
See application file for complete search history.

(56) References Cited

U.S. PATENT DOCUMENTS

| 5,554,739 A | 9/1996 | Belmont |
| 5,652,298 A | 7/1997 | Murray |
| 5,691,408 A | 11/1997 | Murray |
| 2002/0016404 A1 | 2/2002 | Mabry et al. |
| 2003/0158298 A1 | 8/2003 | Maruyama et al. |
| 2003/0195276 A1 | 10/2003 | Mabry et al. |
| 2005/0034629 A1 | 2/2005 | Belmont et al. |

FOREIGN PATENT DOCUMENTS

| WO | 96/18688 A1 | 6/1996 |
| WO | 99/16600 A1 | 4/1999 |

*Primary Examiner* — Peter Szekely
(74) *Attorney, Agent, or Firm* — Sughrue Mion, PLLC

(57) ABSTRACT

A water-base adhesive mix for producing tires, having, by weight, 5 to 80% water, 10 to 60% of a cross-linkable unsaturated-chain polymer base, 0.2 to 1% sulphur, 0.1 to 3% zinc oxide, 0.1 to 1% of accelerating agents, 0.1 to 15% of emulsifiers, and 0.01 to 30% of a carbon black having —$ArA_y$ type functional surface groups,
where:
Ar is an aromatic radical from the group including phenyl, naphthyl, anthracenyl, phenanthrenyl, biphenyl and pyridinyl;
A is a $COO^-$ or $SO_3^-$ functional group;
y is a whole number from 1 to 5 when Ar is phenyl, from 1 to 7 when Ar is naphthyl, from 1 to 9 when Ar is anthracenyl, phenanthrenyl or biphenyl, and from 1 to 4 when Ar is pyridinyl.

6 Claims, No Drawings

WATER-BASE ADHESIVE MIX FOR PRODUCING TYRES

TECHNICAL FIELD

The present invention relates to a water-base adhesive mix for producing tyres.

BACKGROUND ART

In tyre manufacturing, adhesive mixes, commonly known as cements, are organic-solvent-based. Adhesive mixes of this sort are highly adhesive and easy to use, mainly on account of rubber dissolving readily in organic solvents and so blending with other rubber to form practically one piece once the organic solvent evaporates.

This type of adhesive mix has the major drawback of containing a large amount of organic solvent, which, as is known, is highly volatile and, because of its characteristics, may pose environmental problems.

For all these reasons, recent European directives have imposed a drastic reduction in the use of organic solvents in tyre manufacturing, thus forcing manufacturers to devise alternative solutions to ensure correct adhesion of rubber layers.

One alternative to conventional adhesive mixes is water-base adhesive mixes, in which organic solvent is replaced by water solvent, and which pose the problem of ensuring dispersion in water of intrinsically hydrophobic ingredients. This is done using emulsifiers which, as is known, comprise a hydrophobic group capable of bonding the ingredient in question, and a hydrophilic group capable of ensuring its dispersion in water. Tests show, however, that the presence of emulsifiers may impair the adhesive strength of the adhesive mix.

Minimizing the amount of emulsifiers used in water-base adhesive mixes is therefore a crucial issue.

One of the components requiring most emulsifier is carbon black, both on account of the organic nature of commonly used carbon black, and the large amount of it used in the adhesive mix.

DISCLOSURE OF INVENTION

It is an object of the present invention to provide a water-base adhesive mix designed to solve the problems of the known art.

BEST MODE FOR CARRYING OUT THE INVENTION

According to the present invention, there is provided a water-base adhesive mix for producing tyres, comprising, by weight, 5 to 80% water, 10 to 60% of a cross-linkable unsaturated-chain polymer base, 0.2 to 1% sulphur, 0.01 to 30% of a reinforcing filler, 0.1 to 3% zinc oxide, 0.1 to 1% of accelerating agents, and 0.1 to 15% of emulsifiers; said adhesive mix being characterized in that the reinforcing filler comprises a carbon black having —$ArA_y$ type functional surface groups, where:
Ar is an aromatic radical from the group comprising phenyl, naphthyl, anthracenyl, phenanthrenyl, biphenyl and pyridinyl;
A is a $COO^-$ or $SO_3^-$ functional group;
y is a whole number from 1 to 5 when Ar is phenyl, from 1 to 7 when Ar is naphthyl, from 1 to 9 when Ar is anthracenyl, phenanthrenyl or biphenyl, and from 1 to 4 when Ar is pyridinyl.

Preferably, the carbon black used has a mean particle size distribution of below 150 nm.

Preferably, the carbon black used has a surface area, expressed as an iodine number, of 150 to 225 g/kg.

Preferably, the water-base adhesive mix comprises 4 to 25% by weight of reinforcing filler.

Preferably, the water-base adhesive mix comprises 0.1 to 3% by weight of emulsifiers.

The following examples are purely indicative and non-limiting, for a clear understanding of the invention.

EXAMPLES

Three adhesive mixes A, B, C were prepared. Mix A is an organic-solvent-base adhesive mix; mix B a water-base adhesive mix in accordance with the known art; and mix C a water-base adhesive mix in accordance with the invention.

The compositions of the three mixes are shown in Table I

TABLE I

|  | A | B | C |
|---|---|---|---|
| WATER | — | 49.0 | 50.0 |
| HEPTANE | 70.0 | — | — |
| NATURAL RUBBER | 18.0 | 25.0 | 23.0 |
| CARBON BLACK (1) | 9.0 | 13.0 | — |
| CARBON BLACK (2) | — | — | 19.0 |
| STEARIC ACID | 0.6 | — | — |
| ZINC OXIDE | 0.3 | 1.0 | 1.0 |
| ADHESIVE RESIN | 2.0 | 5.0 | 5.6 |
| POLYURETHANE RESIN | — | 0.5 | 0.5 |
| POLYISOCYANATES | — | 0.5 | 0.5 |
| SULPHUR | 0.3 | 0.5 | 0.5 |
| SULPHONAMIDE | 0.3 | 0.5 | 0.5 |
| EMULSIFIERS | — | 5.0 | 0.3 |

CARBON BLACK (1) is a standard carbon black commonly used in tyre manufacturing mixes; and CARBON BLACK (2) is a commercial carbon black as claimed, whose organic group —$ArA_y$ has a phenyl as Ar, and $COO^-$ as A, and which has a mean particle size distribution of 130 nm.

The carbon black whose use in water-base adhesive mixes is claimed is prepared as described in CABOT CORPORATION U.S. Pat. No. 5,554,739, which is included herein by way of reference.

As will be clear to an expert, in addition to natural rubber, the adhesive mixes according to the present invention may comprise any cross-linkable chain polymer base obtained by polymerization of conjugate dines and/or aliphatic or aromatic vinyl monomers. For example, usable polymer bases are selected from the group comprising natural rubber, 1,4-cis polyisoprene, polybutadiene, isoprene-isobutene copolymers, possibly halogenated, butadiene-acrylonitrile copolymers, styrene-butadiene copolymers and styrene-butadiene-isoprene terpolymers, both in solution and emulsion, and ethylene-propylene-diene terpolymers. The above polymer bases may be used singly or mixed.

Laboratory Tests

Each mix was adhesion tested on both green and cured rubber, as per ASTM Standard D624, was tested for rheometric properties as per ASTM Standard D5289, and was viscosity-tested as per ASTM Standard D6080. Table II shows the test results.

TABLE II

|  | A | B | C |
|---|---|---|---|
| Viscosity (cps) | 100 | 100 | 100 |
| ML (dNm) | 1.3 | 3.4 | 2.0 |
| MH (dNm) | 14.8 | 12.5 | 14.9 |

TABLE II-continued

|   | A | B | C |
|---|---|---|---|
| T10 (min) | 0.5 | 0.3 | 0.9 |
| T50 (min) | 1.1 | 0.8 | 1.3 |
| T90 (min) | 3.0 | 2.3 | 2.0 |
| Green-rubber adhesion (N/mm) | 2.00 | 1.40 | 1.50 |
| Cured-rubber adhesion (N/mm) | 20.00 | 13.00 | 20.00 |

*The cured rubber was obtained as per ASTM Standard 1382, by curing for 10 minutes at a constant temperature of 160° C.

As shown in Table II, mix C containing small amounts of emulsifier has the same adhesion values as organic-solvent-base adhesive mixes (mix A), whereas mix B containing larger amounts of emulsifier has a much lower adhesive strength.

Reducing the amount of emulsifiers used in the water-base adhesive mix is made possible by using carbon black comprising functional surface groups as claimed. Carbon black comprising such functional groups, in fact, requires no emulsifiers for dispersion in water.

As shown in Table II, using a carbon black as claimed in no way impairs the other characteristics, such as viscosity and rheometric properties, of the mix.

The invention claimed is:

1. A water-base adhesive mix for producing tyres, comprising, by weight, 5 to 80% water, 10 to 60% of a cross-linkable unsaturated-chain polymer base, 0.2 to 1% sulphur, 0.01 to 30% of a reinforcing filler, 0.1 to 3% zinc oxide, 0.1 to 1% of accelerating agents, and 0.1 to 15% of emulsifiers; said adhesive mix being characterized in that the reinforcing filler comprises a carbon black having —$ArA_y$ functional surface groups, where:

Ar is an aromatic radical selected from the group consisting of phenyl, naphthyl, anthracenyl, phenanthrenyl, biphenyl and pyridinyl;

A is a $COO^-$ or $SO_3^-$ functional group;

y is a whole number from 1 to 5 when Ar is phenyl, from 1 to 7 when Ar is naphthyl, from 1 to 9 when Ar is anthracenyl, phenanthrenyl or biphenyl, and from 1 to 4 when Ar is pyridinyl.

2. A water-base adhesive mix as claimed in claim 1, characterized in that said carbon black has a mean particle size distribution of below 150 nm.

3. A water-base adhesive mix as claimed in claim 1, characterized in that said carbon black has a surface area, expressed as an iodine number, of 150 to 225 g/kg.

4. A water-base adhesive mix as claimed in claim 1, characterized by comprising 4.0 to 25.0% by weight of reinforcing filler.

5. A water-base adhesive mix as claimed in claim 1, characterized by comprising 0.1 to 3.0% by weight of emulsifiers.

6. A tyre produced using a water-base adhesive mix as claimed in claim 1.

* * * * *